United States Patent [19]

Ezaki et al.

[11] Patent Number: 4,893,203
[45] Date of Patent: Jan. 9, 1990

[54] MAGNETIC HEAD

[75] Inventors: Joichiro Ezaki; Yoshiaki Itoh; Shunichi Katase; Mikio Matsuzaki, all of Saku, Japan

[73] Assignee: TDK Corporation, Tokyo, Japan

[21] Appl. No.: 229,426

[22] Filed: Aug. 8, 1988

[30] Foreign Application Priority Data

Aug. 14, 1987 [JP] Japan .................................. 62-202892

[51] Int. Cl.4 ............................................. G11B 5/60
[52] U.S. Cl. .................................................. 360/103
[58] Field of Search ......................................... 360/103

[56] References Cited

U.S. PATENT DOCUMENTS 4,639,803 1/1987 Takeda et al. ...................... 360/103
4,796,127 1/1989 Wada et al. ........................ 360/103

Primary Examiner—Robert S. Tupper
Attorney, Agent, or Firm—Oblon, Spivak, McClelland, Maier & Neustadt

[57] ABSTRACT

A magnetic head comprises a slider having a flying plane on its one surface opposed to a magnetic recording medium, a reading/writing element attached to the end surface at the air discharge side of the slider and a protective layer formed on the end surface so as to cover the reading/writing element, wherein an edge of the protective layer is inside an edge of the end surface at at least the upper surface which is opposite the flying plane, so that there is formed a space between the edge of the end surface and the edge of the protective layer.

3 Claims, 6 Drawing Sheets

FIGURE 10a
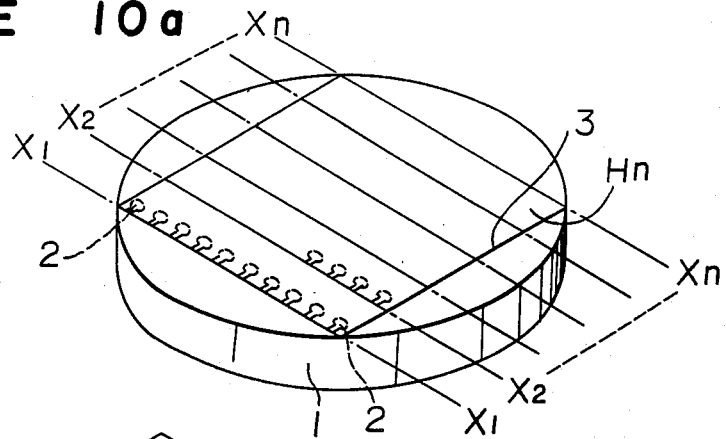
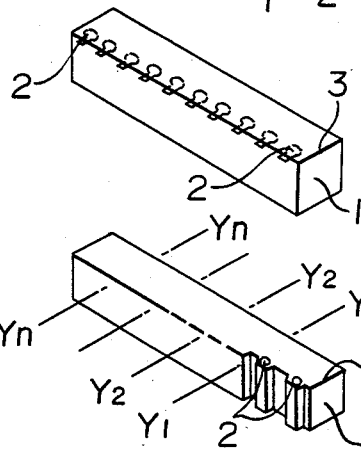
FIGURE 10b
$H_1 \sim H_n$
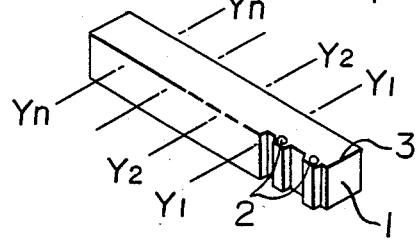
FIGURE 10c
FIGURE 11
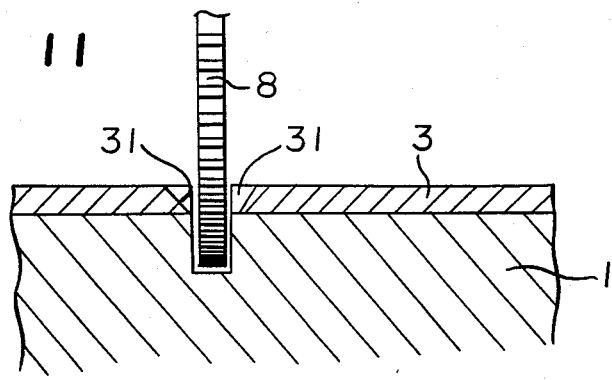

MAGNETIC HEAD

BACKGROUND OF THE INVENTION

1. Field of the Invention

The present invention relates to a flying type magnetic head wherein a reading/writing element and a protective layer are attached to the end surface at the air discharge side of a slider.

2. Discussion of Background

A flying type magnetic head is of such a type that a small flying height is obtained between the magnetic head and a magnetic disc by utilizing a dynamic pressure caused by the viscosity of air when the head is relatively moved against the magnetic disc. Generally, it is so constructed that as shown in FIG. 7, reading/writing elements are attached to the end surface 101 at the air discharge side of a slider 1 made of a ceramic body such as $Al_2O_3$, TiC, and the reading/writing elements are covered by a protective layer 3. Reference numerals 4 designate lead wires for the reading/writing elements, which are formed on the surface of the protective layer 3.

As the slider 1, there has widely been used the so-called taper flat type slider, wherein a flying plane 103 is formed on the surface of each of rail portions 102 which project from the surface opposing to the magnetic disc with a certain distance, and a tapered portion 103a is formed at an end at the air discharge side of each of the flying planes 103 so as to produce a lifting force to the magnetic head.

The reading/writing elements 2 are respectively thin film elements formed by using the same process as the IC manufacture technology.

FIG. 8 is an enlarged cross-sectional view of a portion near the reading/writing element 2 wherein a reference 21 designates a lower magnetic layer made of a material such as permaloy, a numeral 22 designates an interlayer formed by a material such as $Al_2O_3$, SiC and so on, a numeral 23 designates a coil conductor, numerals 25-27 designate layer insulators formed by a photoresist method, and a numeral 28 designates an upper magnetic layer made of a material such as permaloy. The protective layer 3 covers the reading/writing elements 2 and the substantially entire part of the end surface 101 of the slider 1 by sputtering a material such as $Al_2O_3$, SiC and so on.

However, the conventional magnetic haed had problems as follows.

(a) As shown in FIG. 9, the conventional magnetic disc device was so constructed that a lead wire 5 is firmly attached to a lead conductor 4 for the reading/writing element 2 by means of soldering and so on, and an overcoating resin 7 was applied on the upper surface side 104 of the end surface 101 (which is opposite the floating plane 103, to electrically insulate and protect the jointing portion of a lead wire 5 and the lead conductor 4. In the conventional magnetic head, however, since the protective layer 3 covered the substantially entire part of the end surface 101 of the slider 1 and the edges of the protective layer 3 were flush with the edges of the end surface 101, the overcoating resin 7 flowed toward the upper surface 104 opposite the flying plane 103. When the overcoating resin 7 was solidified at the upper surface side 104, the dimensions of the outer configuration of the magnetic head changed. In order to eliminate this, it was necessary to remove the overcoating resin 71 solidified at the upper surface side 104; this reducing efficiency in the manufacture of the head.

(b) Since the protective layer 3 was formed to cover the substantially entire part of the end surface 101 of the slider 1, cracks and fragments were apt to produce in the protective layer 3 when cutting operations were carried out to thereby invite reduction in reliability and processability.

FIG. 10 shows schematically how the conventional magnetic heads are manufactured.

First of all, several groups of head pieces $H_1-H_n$ which have reading/writing elements 2 covered by the protective layer are formed on a ceramic substrate 1 as shown in FIG. 10a, then, the head piece groups $H_1-H_n$ are cut at cutting positions $(X_i-X_i)-(X_n-X_n)$, whereby the several groups of said pieces $H_1-H_n$ n are obtained as shown in FIG. 10b.

The resulted head piece groups $H_1-H_n$ are subjected to grooving and grinding which are required to form sliders, and thereafter, each of the head piece groups is cut at cutting positions $(Y_i-Y_i)-(Y_n-Y_n)$ to obtain individual head pieces.

As previously explained in reference to FIG. 7, the protective layer 3 is formed as a single layer on the ceramic substrate including the groups of the head pieces $H_1-H_n$ so that the magnetic heads with the protecting layer 3 covering the substantially entire part of the end surface 101 of the slider 1 can effectively be obtained. Accordingly, when the groups of head pieces are cut at the cutting positions $(X_i-X_i)-(X_n-X_n)$ and $(Y_i-Y_i)-(Y_n-Y_n)$, the ceramic substrate 1 and the protective layer 3 are simultaneously cut by a cutter 8 to form the individual sliders as shown in FIG. 11. However, a crack and a fragment 31 are apt to produced in the protective layer 3 since the ceramic substrate 1 is made of a material such as $Al_2O_3$ or TiC, and the protective layer 3 is formed by sputtering a material such as $Al_2O_3$ or SiC. This reduces processability of magnetic head.

In order to eliminate the above-mentioned problem, it was necessary to use separate cutters which are suitable to cut the protective layer 3 and the ceramic substrate 1. However, this inevitably reduces the efficiency of manufacturing the magnetic head.

SUMMARY OF THE INVENTION

It is an object of the present invention to provide a magnetic head enabling to increase processability by eliminating cracks and fragments in the protective layer when the magnetic head is manufactured.

The foregoing and the other object of the present invention have been attained by providing a magnetic head which comprises a slider having a flying plane on its one surface opposed to a magnetic recording medium, a reading/writing element attached to the end surface at the air discharge side of the slider and a protective layer formed on the end surface so as to cover the reading/writing element, wherein an edge of the protective layer is inside an edge of the end surface at at least the upper surface which is opposite the flying plane, so that there is formed a space between the edge of the end surface and the edge of the protective layer.

In the present invention, the protective layer is formed so that the edge of the protective layer is inside the edge of the end surface at the upper surface of the slider which is opposite the flying plane of the slider, whereby a space is produced between the edge of the protective layer and the edge of the slider. Accordingly, there is obtainable a step between the both edges of the protective layer and the slider owing to the presence of the space. The step functions to prevent an overcoating resin applied on the surface of the protective layer from flowing toward the upper surface.

When head piece groups are cut from a wafer, and then individual head pieces are cut from each of the head piece groups, grooves function as escape portions for the cutter, and occurrence of cracks or fragments in the protective layer at the upper surface of the slider can be prevented.

For the individual head piece, the step portion functions as a protective barrier for the protective layer, and the problem such as crack in the protective layer can be eliminated even when the slider comes in contact with an external member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 10a-10c are respectively perspective views showing manufacturing steps of a conventinal magnetic head; and FIG. 11 is a cross-sectional view showing a manufacturing process of the conventional magnetic head.

DETAILED DESCRIPTION OF THE PREFERRED EMBODIMENTS

Figure 1:
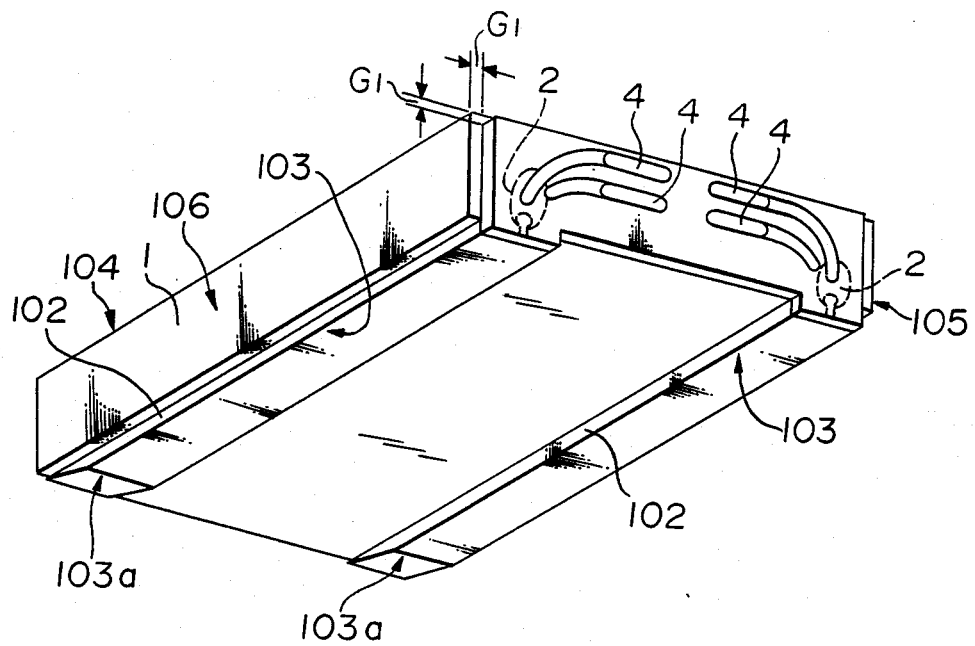
FIG. 1 is a perspective view of an embodiment of the flying type magnetic head according to the present invention.
Figure 2:
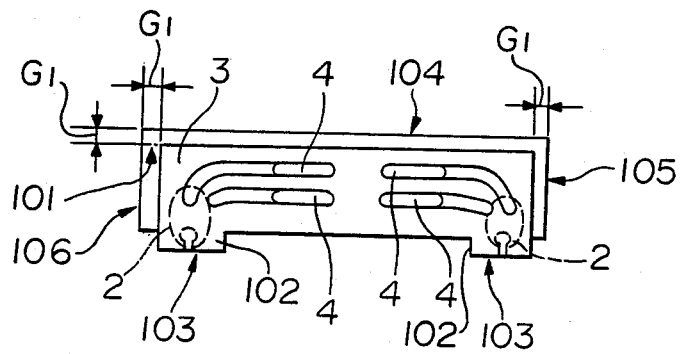
FIG. 2 is a side view viewed from the air discharge side in FIG. 1.

Referring to the drawings, wherein the same reference numerals designate the same or corresponding parts throughout several views and more particularly to FIG. 1, there is shown a flying type magnetic head of the present invention. FIG. 2 shows a side plane of air discharge side of the magnetic head. In FIGS. 1 and 2, the edges of the protective layer 3 at the sides excluding the flying plane of the slider 1 are respectively inside the edges of the end surface 101, to which the reading/writing elements 2 and the protective layer 3 are attached with spaces $G_1$ between the edges of the layer 3 and the edges of the end surface of the slider. Accordingly, steps having the width of the space $G_1$ are formed between the edges (a) of the end surface 101 and the edges (b) of the protective layer 3. It is preferable that the depth of the step is in a range from the same thickness to two times as the thickness of the protective layer 3. The step is preferably in a continuous form which extends between the edges (a) of the end surface 101 and the edges (b) of the protective layer 3 except for the flying plane.

Figure 3:
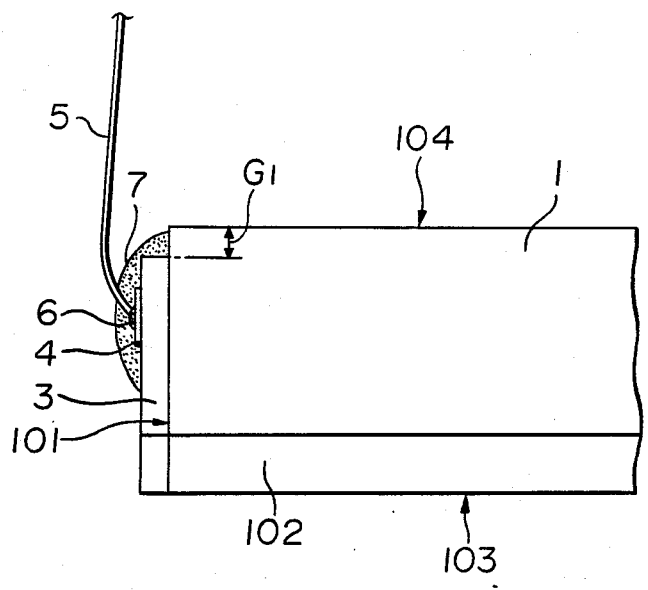
FIG. 3 is an enlarged side view partly cross-sectioned of an important part of the magnetic head shown in FIG. 1.
Figure 4:
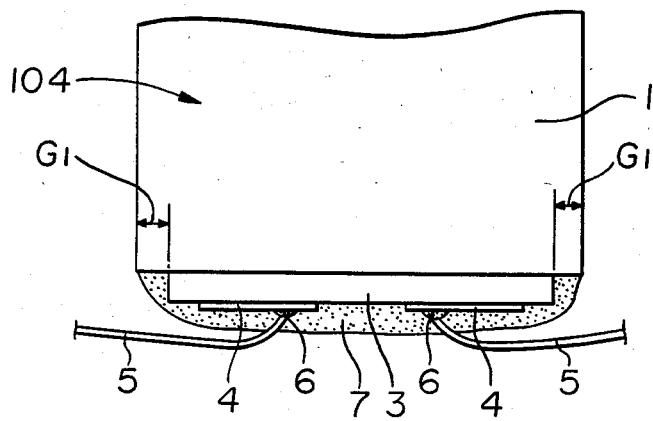
FIG. 4 is an enlarged side view partly cross-sectioned of an important part of the magnetic head shown in FIG. 1.

Thus, by providing spaces $G_1$ formed between the edges of the protective layer 3 and the edges of the end surface 101, the spaces $G_1$ function to stop the overcoating resin 7 applied at the connecting portion of the lead wire from flowing to undesired part as shown in FIGS. 3 and 4 when magnetic head are produced. In the embodiment shown in FIGS. 3 and 4, since the spaces $G_1$ are formed in a continuous form around three sides except for the side corresponding to the flying plane 103, i.e. between the edges (a) of the both sides 105, 106 and the upper surface 104 in the end surface 101 and the edges (b) of the protective layer 3, overflowing and adhesion of the overcoating resin 7 on the upper surface 104 and the side surfaces 105, 106 of the slider 1 can be avoided.

Figure 5:
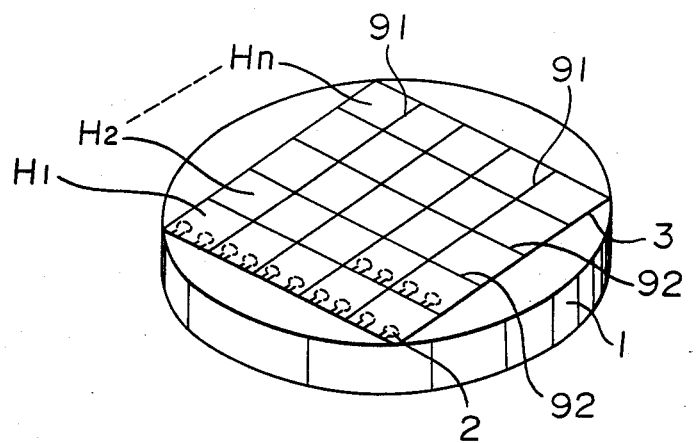
FIG. 5 is a perspective view showing manufacturing processes of the magnetic head according to the present invention.
Figure 6:
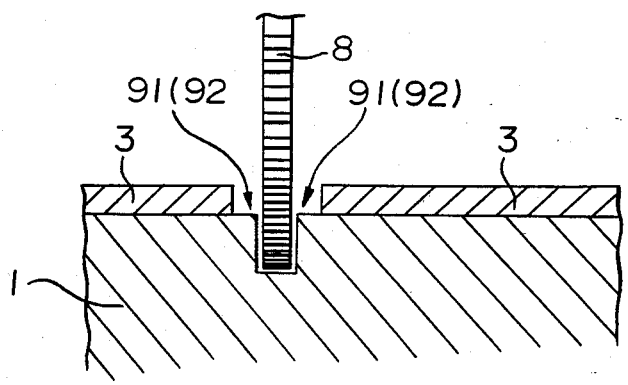
FIG. 6 is a cross-sectional view showing a manufacturing process of the magnetic head of the present invention.
Figure 7:
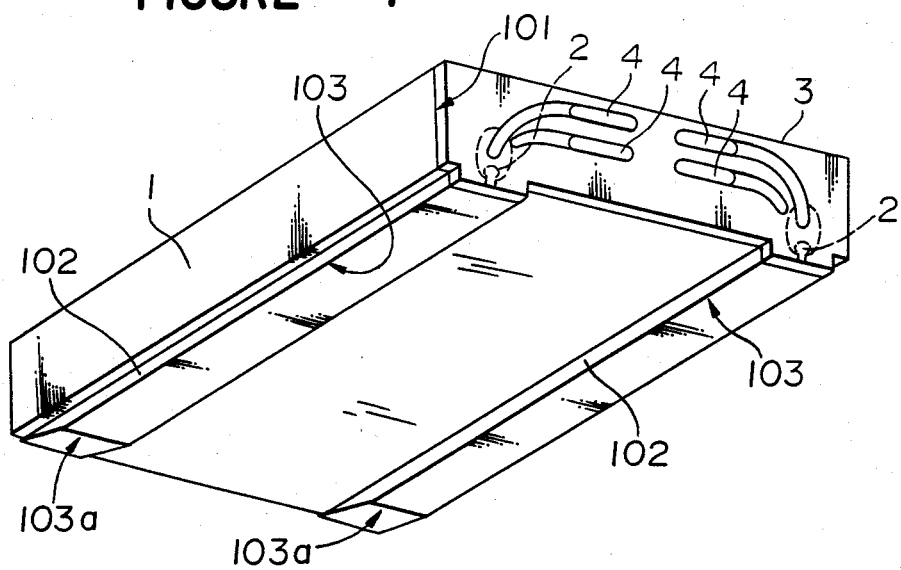
FIG. 7 is a perspective view of a conventional magnetic head.
Figure 8:
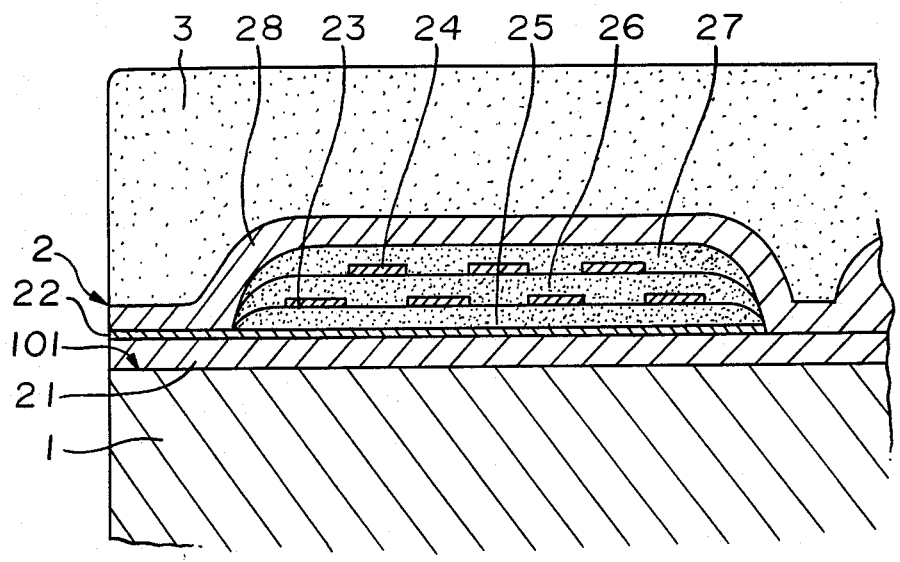
FIG. 8 is an enlarged cross-sectional view partly broken of an important part of the conventional magnetic head.
Figure 9:
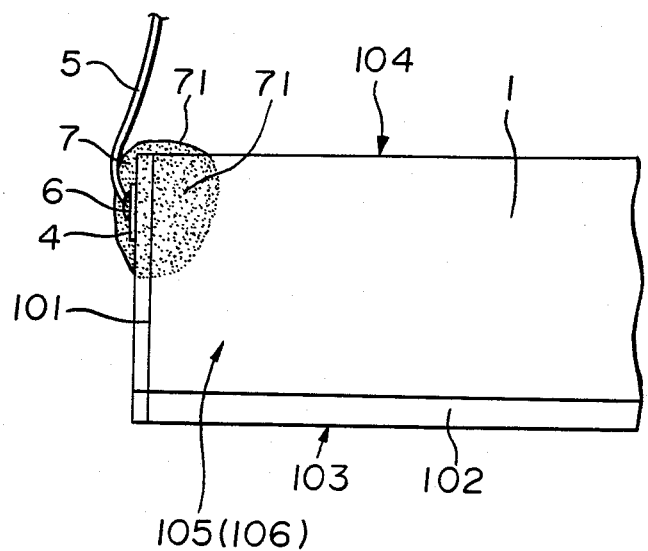
FIG. 9 is an enlarged side view partly cross-sectioned of an important part of the magnetic head shown in FIG. 7.

As shown in FIG. 5, linear grooves 91 may be formed at the boundaries between the head piece groups $H_1-H_n$ and linear grooves 42 may be formed at the boundaries of individual head pieces. In this case, when the head piece groups and the individual head pieces are cut from the wafer, the linear grooves 91, 92 provide escape portions at both sides of the butter, whereby the cracks and the fragments in the protective layer, can be prevented.

After the individual head pieces are formed, the space $G_1$ serves as a protective barrier to the protective layer. Namely, occurrence of the crack or the fragment in the protective layer caused by the contact of an external member can be avoided.

The reason why the edges of the protective layer 3 are inside the edges (a) of the end surface 101 except the flying plane 103 of the slider 1 is as follows. The edge of the flying plane 103 is subjected to grinding operation after cutting the wafer. Accordingly, any crack and fragment in the protective layer 3 can be removed by grinding the portion. Further, it is seldom that the overcoating resin attaches to the flying plane 103 since the resin is usually applied to the upper portion 104 of the end surface 101 which is opposite the flying plane 103.

Thus, in accordance with the present invention, the following advantages are obtainable.

(a) Formation of the edges of the protective layer inside the edges of the end surface of the slider except the flying plane prevents the overcoating resin from flowing and sticking on the upper surface opposing the flying plane. Therefore, a magnetic head having accurate demensions and a stable flying characteristic can be obtained.

(b) Occurrence of the crack and the fragment in the protective layer can be prevented to increase efficiency of manufacturing the magnetic head.

(c) Occurrence of the crack and the fragment caused by the contact of an external member can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic head which comprises a slider having a flying plane on its one surface opposed to a magnetic recording medium, a reading/writing element attached to the end surface at the air discharge side of said slider and a protective layer formed on said end surface so as to cover said reading/writing element, wherein an edge of said protective layer is inside an edge of said end surface at at least the upper surface which is opposite said flying plane, so that there is formed a space between the edge of said end surface and the edge of said protective layer.

2. The magnetic head according to claim 1, wherein the edges of said protective layer are respectively inside the edges of said end surface except for the edge of said flying plane.

3. The magnetic head according to claim 1, wherein said space is continuously formed around said protective layer.

* * * * *